Sept. 25, 1956     O. E. ANDRUS     2,764,541
CATHODICALLY PROTECTED WATER HEATER STORAGE
TANK WITH GAS DISPOSAL ATTACHMENT
Filed Aug. 18, 1952

INVENTOR.
Orrin E. Andrus
BY
ATTORNEYS.

United States Patent Office 2,764,541
Patented Sept. 25, 1956

2,764,541

CATHODICALLY PROTECTED WATER HEATER STORAGE TANK WITH GAS DISPOSAL ATTACHMENT

Orrin E. Andrus, Milwaukee, Wis., assignor to A. O. Smith Corporation, Milwaukee, Wis., a corporation of New York Application August 18, 1952, Serial No. 305,093

4 Claims. (Cl. 204—197)

This invention relates to a cathodically protected water heater storage tank with gas disposal attachment.

The cathodic protection of the inside of a tank containing water effects evolution of hydrogen at the cathode surface. Furthermore, where a sacrificial anode is employed to provide the current flow to the cathode, additional hydrogen may be produced by local attack upon the constituents of the anode.

Where such cathodically protected water heater storage tanks are left standing for substantial periods without replacement of the water therein, sufficient hydrogen may be generated to more than saturate the water contained in the tanks, whereupon hydrogen gas will accumulate in the top of the tanks. Heretofore, except that adequate added storage space for the hydrogen be provided in the top of the tank, there has been and always is the possibility that slugs of hydrogen may be discharged at the faucet and present the danger of ignition and even of explosion.

The principal object of the present invention is to prevent slugs of hydrogen from reaching the faucet regardless of the period of dormancy between withdrawal of water.

Another object of the invention is to increase the safety of operation of cathodically protected water heaters.

Another object is to avoid the necessity for providing substantial hydrogen storage space at the top of the tank, thereby maintaining the water capacity for the tank at all times.

According to the invention, the hydrogen is allowed to escape from the top of the tank at a point above the level of the outlet for hot water, so that hydrogen gas never enters the outlet.

The invention is illustrated in the accompanying drawings in which.

Figure 1:
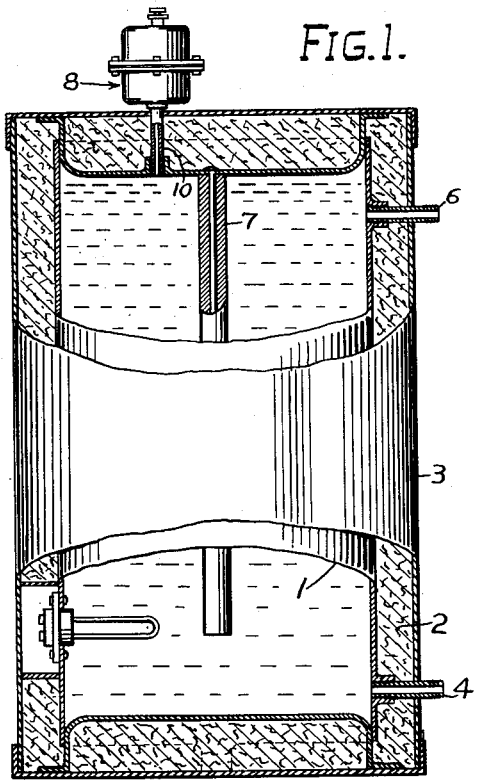
Figure 1 is a side elevation of a domestic water heater with parts broken away and sectioned to show the tank construction.
Figure 2:
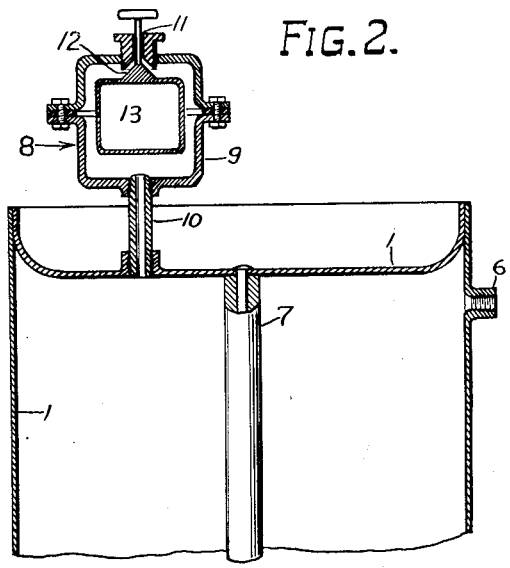
Fig. 2 is an enlarged detail section of the upper end of the tank showing the bleeder valve.
Figure 3:
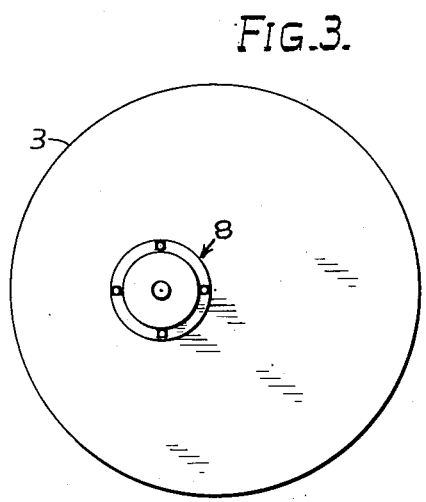
Fig. 3 is a top plan view of the tank.

The water heater comprises a tank 1 encased in suitable insulation 2 and outer casing 3. The tank 1 is generally cylindrical and upright and has a cold water inlet 4 charging cold water into the tank near the bottom.

A hot water outlet 6 connects with the top of the tank at a location leaving a slight space above the outlet for the collection of hydrogen gas above the same.

The tank wall is maintained cathodic by any suitable means such as the sacrificial anode 7 of magnesium or the like suspended from the top of the tank and electrically connected thereto. A non-sacrificial anode may be employed with an external current source for cathodic protection, if desired.

According to the invention, as hydrogen gas collects in the top of the tank it is allowed to escape by means of a valve 8 which may be disposed in a separate chamber 9 attached to the tank. Chamber 9 is connected to the tank by a threaded nipple 10 through which the gas passes from the tank into the chamber.

A bleeder opening 11 for the escape of gas is provided at the top of chamber 9 and is controlled by a needle or conically seated valve member 12 carried by the float 13 within the chamber.

When the tank is filled with water, air will escape from bleeder opening 11 until the water rises in chamber 9 sufficient to lift float 13 and cause valve member 12 to seat in opening 11 to close the latter.

In the operation of the heater whenever sufficient hydrogen collects in chamber 9 to lower the water level therein, float 13 drops and opens bleeder opening 11 for the escape of the hydrogen, after which the float is again raised automatically to shut the opening.

In the construction of float 13, the weight of the float is sufficient to overcome any internal pressure in the system, tending to keep valve member 12 seated in opening 11. The buoyancy of float 13 is sufficient to effect a proper closure of opening 11 upon lifting of the valve by raising of the water level in chamber 9.

Valve 8 may have various forms of construction, the essential being to provide for gas bleeding from the tank without permitting water to leak from the tank.

Figure 4:
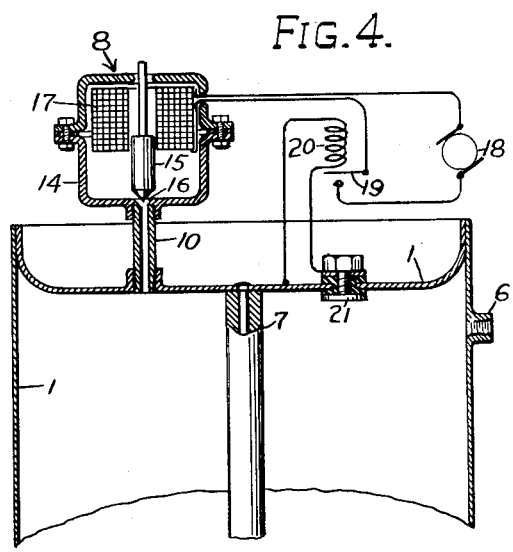
Fig. 4 is a detail section showing a modified construction.

For instance, the valve 8 may be solenoid controlled, as shown in Fig. 4, instead of float controlled. In this construction the casing 14 has a solenoid core 15 with a lower end of conical form to seat in port 16 centrally of the bottom of casing 14 at the upper end of nipple 10.

The coil 17 of solenoid core 15 is energized by connection to a suitable electric power source 18. A coil controlled switch 19 is connected in the circuit of solenoid coil 17 to interrupt current flow to the latter. Switch 19 is operated by a coil 20 having its terminals connected respectively to the tank wall 1 and to a small control electrode 21 in contact with the water in the top of the tank and insulated from the tank. Current is supplied to the circuit of coil 20 by the sacrifiicial anode 7 which flows current through the water to electrode 21, thence through coil 20 and back to tank wall 1 to which anode 7 is connected.

When hydrogen gas accumulates at the top of the tank it lowers the water level to below the control electrode 21, thereby de-energizing coil 20 and permitting closing of the contacts of switch 19. Closing of switch 19 energizes solenoid coil 17 and causes the core 15 to lift off from port 16 and permit escape of the hydrogen from the top of the tank. When sufficient hydrogen has escaped to effect raising of the water level into contact with electrode 21, the coil 20 will be re-energized and open switch 19, thereby de-energizing coil 17 and dropping core 15 to close port 16.

The core 15 should have sufficient weight to close port 16 and seal the same against the normal internal pressures in tank 1.

Various embodiments of the invention may be employed within the scope of the accompanying claims.

I claim:

1. A cathodically protected water storage tank comprising a closed tank having water inlet and outlet openings disposed below the top of the tank, means to make the tank wall cathodic to counteract corrosion of the same and whereby hydrogen is generated at exposed areas of the tank wall and tends to collect at the top of the tank, and valve controlled gaseous outlet means opening only from the top of the tank at a point above the inlet and outlet openings to vent the hydrogen therefrom and maintain the water level at all times substantially above said inlet and outlet openings whereby the danger of hydrogen slugs passing out with the water through said outlet opening is avoided.

2. The combination of claim 1, in which the means to make the tank wall cathodic comprises a magnesium rod electrically connected to the tank wall.

3. The combination of claim 1, in which the valve is float controlled.

4. The combination of claim 1, in which the valve is electrically operated by means automatically responsive to the level of the water in the tank.

References Cited in the file of this patent

UNITED STATES PATENTS

| 1,009,044 | Burgess | Nov. 21, 1911 |
| 2,329,961 | Walker | Sept. 21, 1943 |